(12) United States Patent
Park et al.

(10) Patent No.: US 11,772,951 B2
(45) Date of Patent: Oct. 3, 2023

(54) COOLING UNIT FOR WATER PURIFIER

(71) Applicant: LG ELECTRONICS INC., Seoul (KR)

(72) Inventors: Jongwoo Park, Seoul (KR); Kwangyong An, Seoul (KR); Seonwoong Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 617 days.

(21) Appl. No.: 16/975,343

(22) PCT Filed: Oct. 25, 2018

(86) PCT No.: PCT/KR2018/012717
§ 371 (c)(1),
(2) Date: Aug. 24, 2020

(87) PCT Pub. No.: WO2019/164085
PCT Pub. Date: Aug. 29, 2019

(65) Prior Publication Data
US 2020/0399109 A1    Dec. 24, 2020

(30) Foreign Application Priority Data
Feb. 23, 2018    (KR) .................. 10-2018-0021923

(51) Int. Cl.
*B67D 1/08*    (2006.01)
*C02F 1/04*    (2023.01)
*F25D 31/00*    (2006.01)

(52) U.S. Cl.
CPC ......... *B67D 1/0859* (2013.01); *B67D 1/0864* (2013.01); *C02F 1/043* (2013.01);
(Continued)

(58) Field of Classification Search
CPC ............... B67D 1/0859; B67D 1/0864; B67D 2210/00002; C02F 1/043; C02F 2307/10; F25D 31/003; E03C 1/044
See application file for complete search history.

(56) References Cited

U.S. PATENT DOCUMENTS

2017/0153056 A1    6/2017    Kim et al.
2017/0319990 A1*   11/2017    Jeon .................... B67D 1/1256
(Continued)

FOREIGN PATENT DOCUMENTS

JP    2015-34040 A    2/2015
KR    10-2010-0034942 A    4/2010
(Continued)

OTHER PUBLICATIONS

International Search Report (PCT/ISA/210) issued in PCT/KR2018/012717, dated Jan. 29, 2019.

*Primary Examiner* — Donnell A Long
(74) *Attorney, Agent, or Firm* — Birch, Stewart, Kolasch & Birch, LLP

(57) ABSTRACT

Disclosed herein is a water purifier including a coolant tank configured to store coolant, a partitioning plate configured to partition an internal space of the coolant tank into an upper space and a lower space and having a grid rib formed therein to enable coolant of the upper space and coolant of the lower space to circulate, a cold water pipe disposed in the lower space, an evaporator disposed in the upper space, and an agitator disposed inside the coolant tank, wherein the partitioning plate includes an outer water flow guide sleeve extending downwardly from a bottom surface thereof.

16 Claims, 6 Drawing Sheets

(52) U.S. Cl.
CPC .. *F25D 31/003* (2013.01); *B67D 2210/00002* (2013.01); *C02F 2307/10* (2013.01)

(56) References Cited

U.S. PATENT DOCUMENTS

| | | |
|---|---|---|
| 2018/0016128 A1 | 1/2018 | Park |
| 2018/0216868 A1 | 8/2018 | Park |
| 2019/0276299 A1* | 9/2019 | Park .................... B67D 1/0859 |

FOREIGN PATENT DOCUMENTS

| | | |
|---|---|---|
| KR | 10-2011-0065979 A | 6/2011 |
| KR | 10-2017-0024969 A | 3/2017 |
| KR | 10-2017-0047851 A | 5/2017 |
| KR | 10-2017-0063452 A | 6/2017 |

* cited by examiner

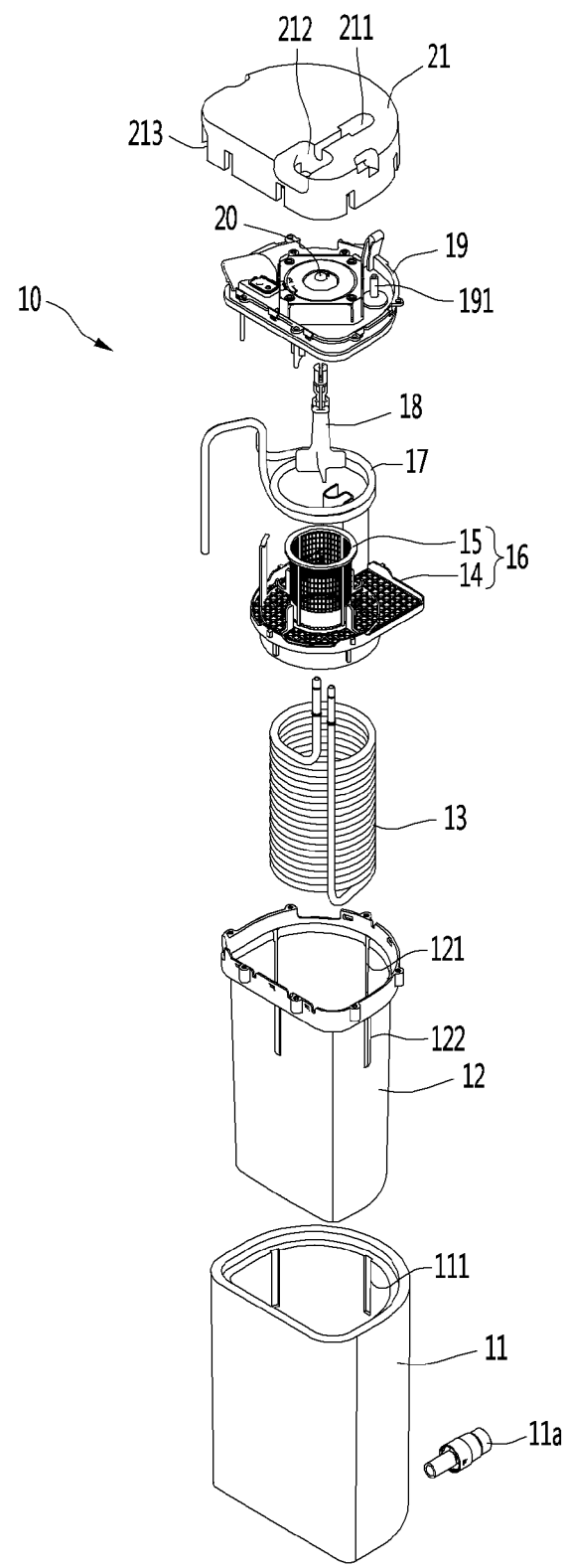
[Fig. 1]

[Fig. 2]
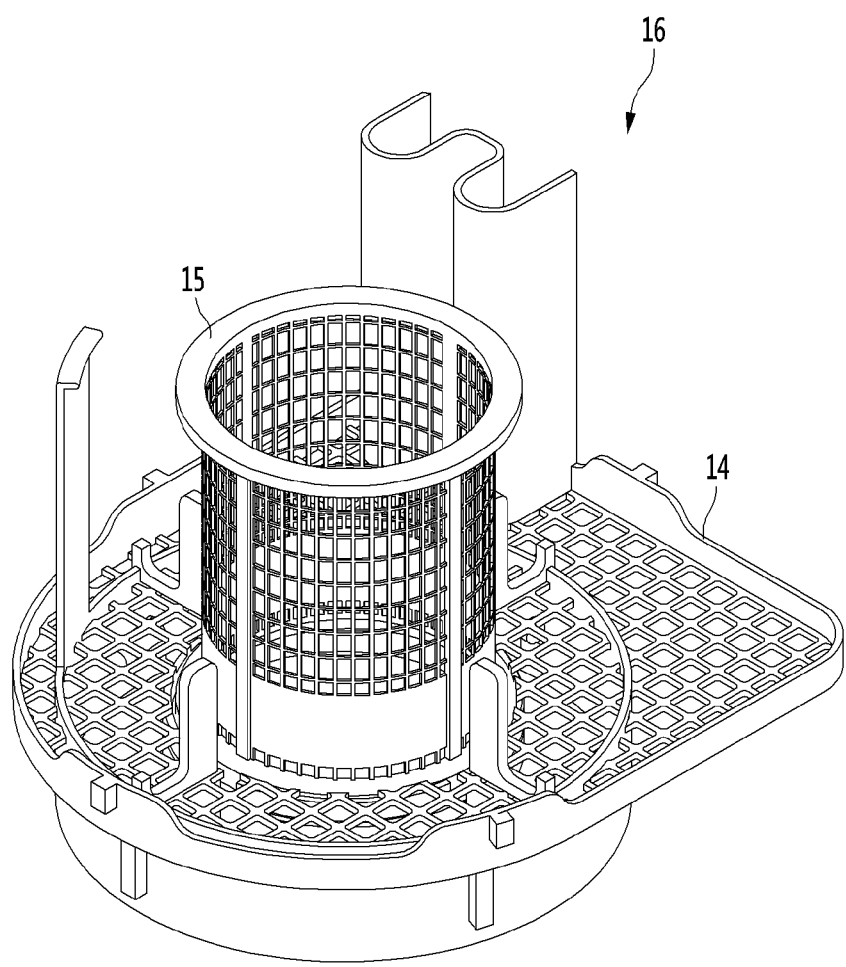

[Fig. 3]
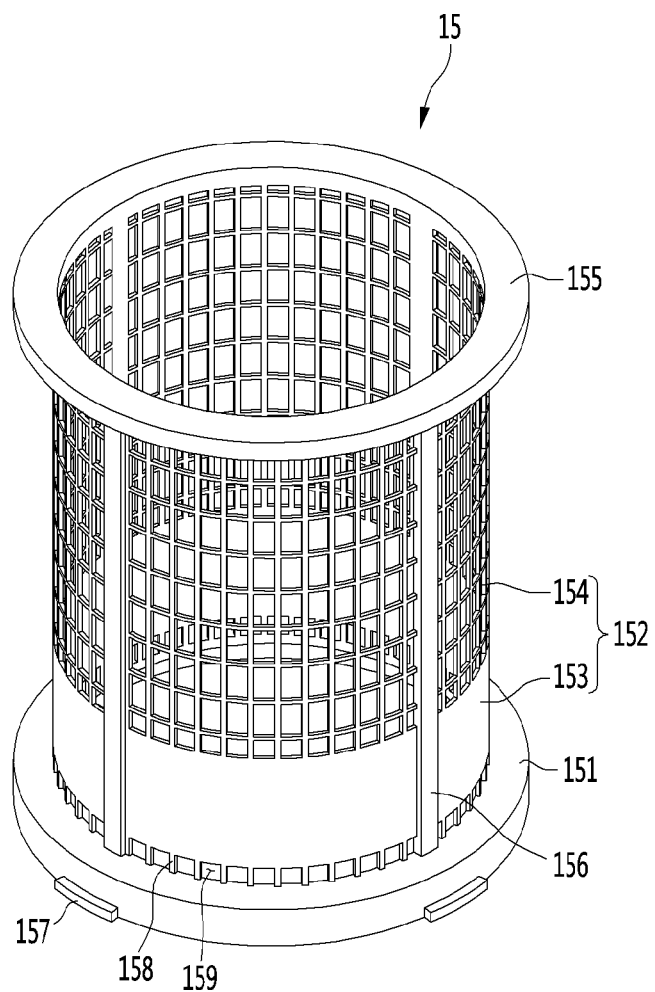

[Fig. 4]
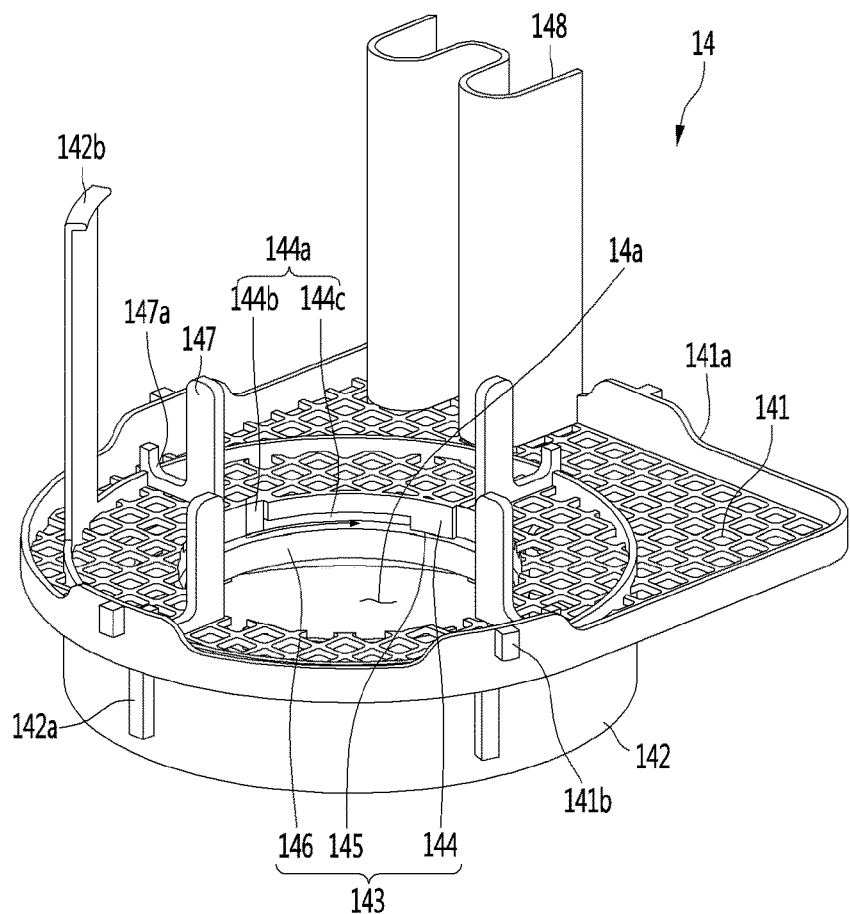
[Fig. 5]
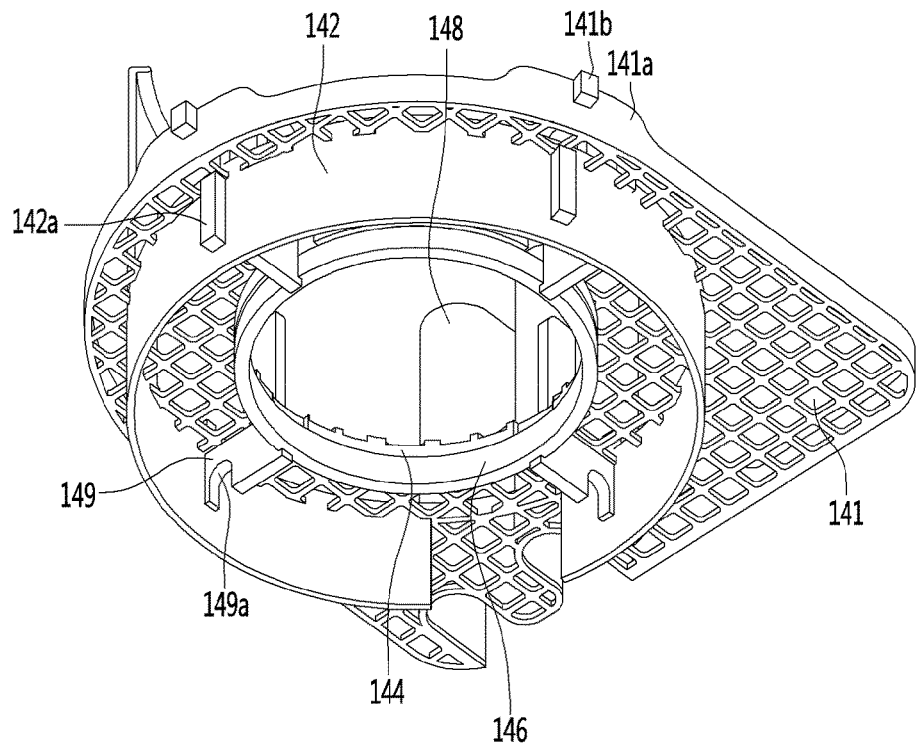

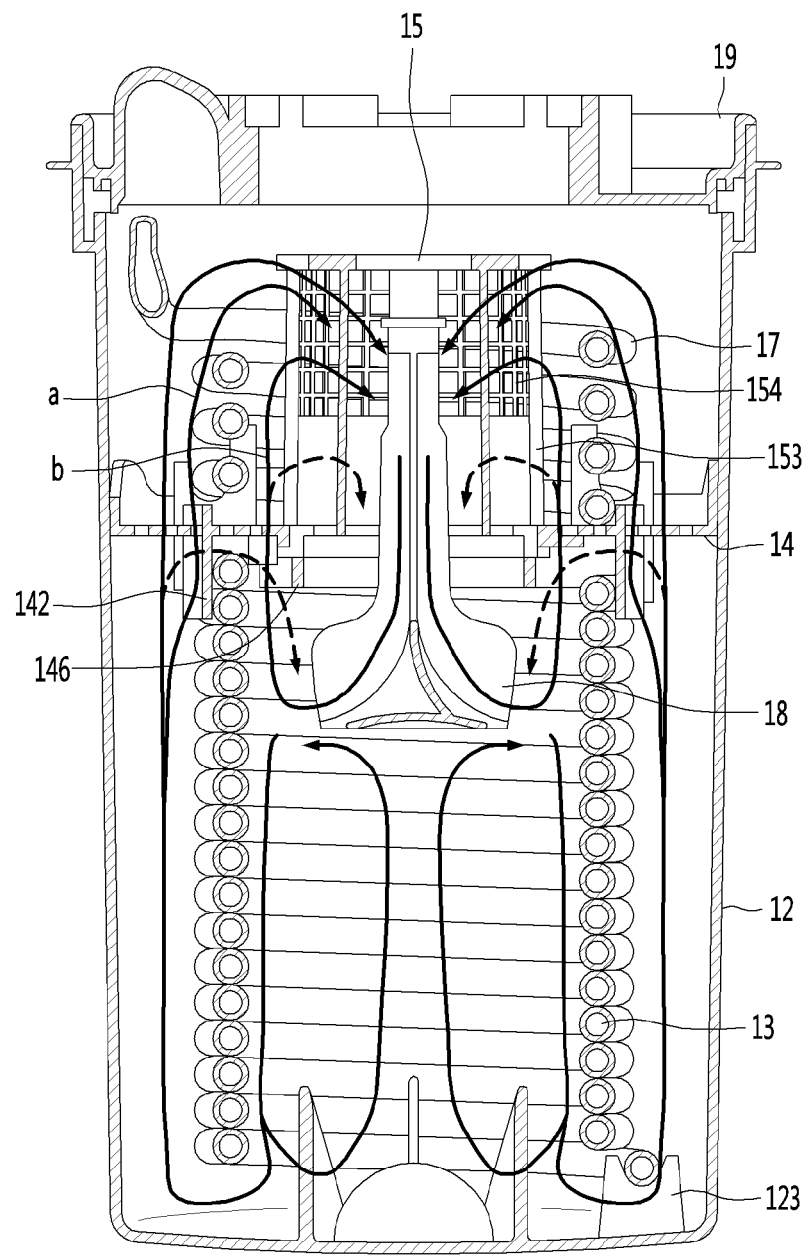
[Fig. 6]

[Fig. 7]
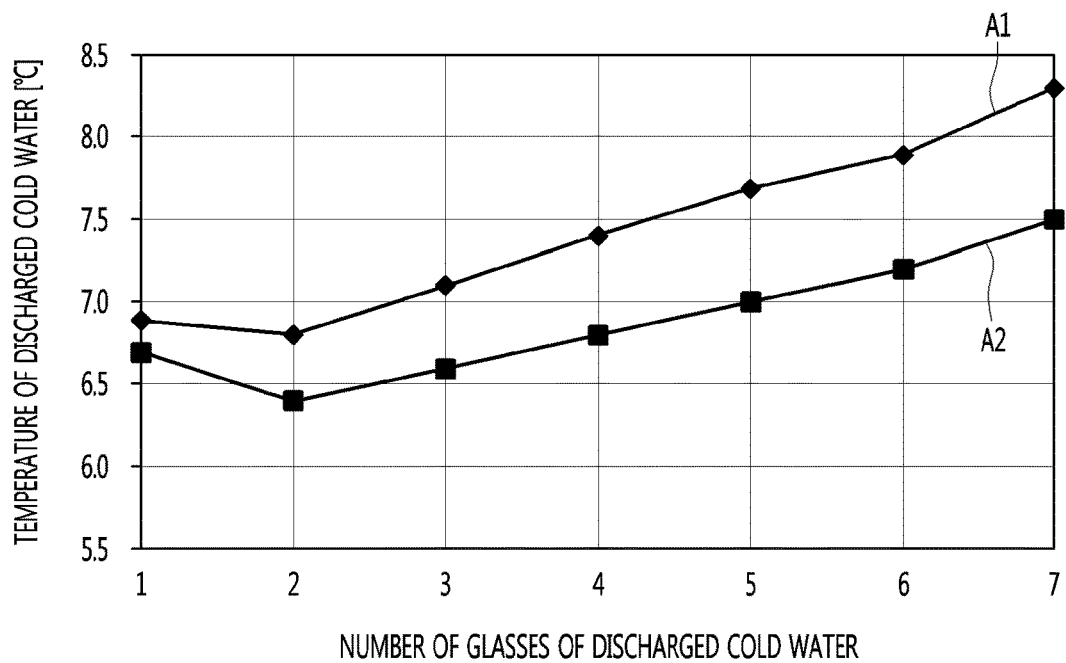
[Fig. 8]
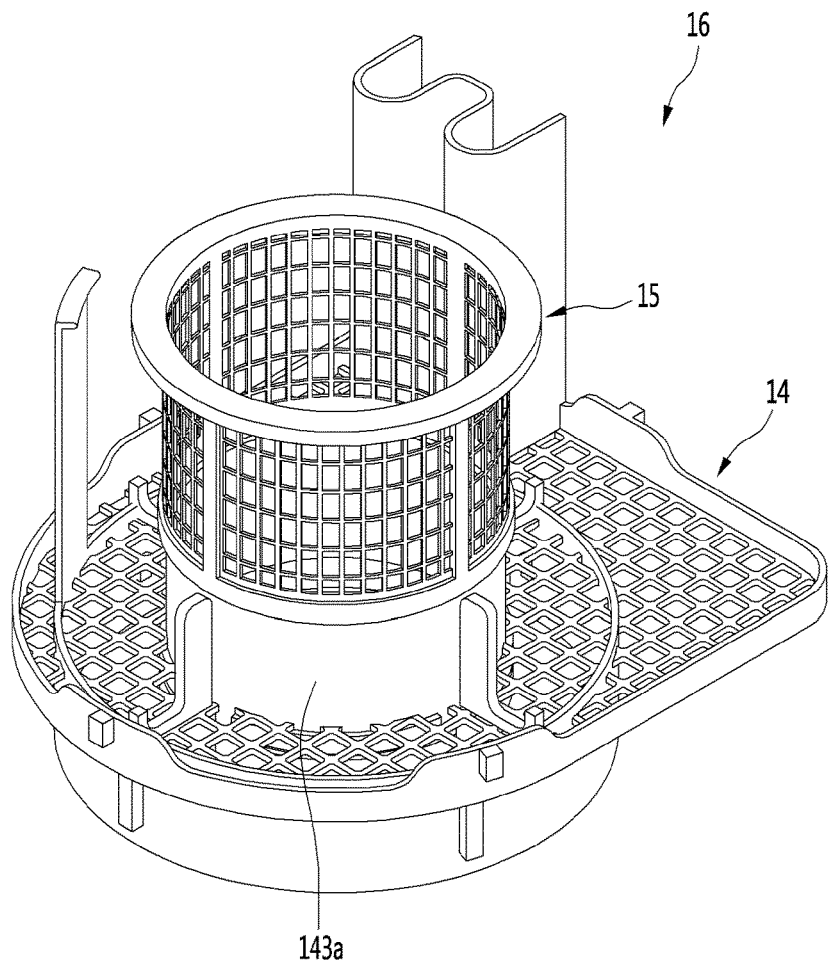

COOLING UNIT FOR WATER PURIFIER

CROSS REFERENCE TO RELATED APPLICATIONS

This application is the National Phase of PCT International Application No. PCT/KR2018/012717, filed on Oct. 25, 2018, which claims priority under 35 U.S.C. 119(a) to Patent Application No. 10-2018-0021923, filed in the Republic of Korea on Feb. 23, 2018, all of which are hereby expressly incorporated by reference into the present application.

TECHNICAL FIELD

The present invention relates to a water purifier.

BACKGROUND ART

A water purifier is a device for filtering out harmful elements such as foreign materials or heavy metals contained in water using physical and/or chemical methods.

The prior art described below discloses a direct type water purifier.

The direct type water purifier means a water purifier for coolant supplied through a water tap to a set temperature through a cooling unit and directly supplying water to a consumer without using a water tank, when the consumer pressing a water supply button.

Since the direct type water purifier does not require the water tank, there is no problem that foreign materials are accumulated on the bottom of the water tank and that bacteria propagate in the water tank.

The direct type water purifier includes a coolant tank in which coolant is stored, a cold water pipe and an evaporator disposed in the coolant tank, and a partitioning plate disposed in the coolant tank to partition the internal space of the coolant tank into a space, in which the cold water pipe is received, and a space, in which the evaporator is received, as disclosed in the prior art.

In addition, coolant at an upper side and cooled by the evaporator flows downwardly toward the cold water pipe by rotation of an agitator and cold water in the space, in which the cold water pipe is received, flows upwardly toward the evaporator.

In addition, when a lump of ice is generated on the surface of the evaporator to ac-cumulate cold air, since heat exchange is performed by latent heat as well as sensible heat, it is possible to cool drinking water passing through the cold water pipe in a short time, which is advantageous for the direct type water purifier.

The direct type water purifier having such a structure has the following disadvantages.

First, as the size of ice generated around the evaporator increases, the coolant located below the partitioning plate does not move to the upper side of the partitioning plate, such that heat exchange between the ice and the coolant is not rapidly performed.

In addition, when thin floating ice generated when the ice generated around the evaporator melts flows into the lower side of the partitioning plate through an opening formed in the partitioning plate, the agitator located below the partitioning plate collides with the floating ice upon rotating, thereby causing noise.

PRIOR ART DOCUMENT

Patent Document

Korean Unexamined Patent Publication No. 2017-0024969 (Mar. 8, 2017)

DISCLOSURE OF INVENTION

Technical Problem

An object of the present invention is to solve the above-described problems.

Solution to Problem

To achieve the above objects, there is provided a water purifier including a coolant tank configured to store coolant, a partitioning plate configured to partition an internal space of the coolant tank into an upper space and a lower space and having a grid rib formed therein to enable coolant of the upper space and coolant of the lower space to circulate, a cold water pipe disposed in the lower space, an evaporator disposed in the upper space, and an agitator disposed inside the coolant tank, wherein the partitioning plate includes an outer water flow guide sleeve extending downwardly from a bottom surface thereof.

Advantageous Effects of Invention

The water purifier according to the embodiment of the present invention including the above configuration has the following effects.

First, since one or both of an upper surface and lower surface of a partitioner includes a water flow guide sleeve, coolant located below the partitioner and forcibly flowing by rotation of an agitator is guided to rise to an upper side of the partitioner. Accordingly, heat exchange between ice generated around an evaporator and coolant located below the partitioner is smoothly performed and a heat exchange time is reduced.

Further, since heat exchange between ice and coolant is smoothly performed, heat exchange between coolant and drinking water flowing along a cold water pipe is rapidly performed. As a result, the amount of drinking water recognized as cold water, that is, drinking water discharged at a reference temperature (about 8° C.) or less, is increased as compared to the conventional method. Therefore, it is possible to increase customer satisfaction.

Second, by designing a portion of a lower portion of a partitioning container surrounded by the evaporator to be completely blocked, it is possible to minimize a phenomenon wherein floating ice generated while ice melts by circulation of coolant moves to the lower side of the partitioning plate through an opening formed in the partitioning container. As a result, it is possible to minimize a phenomenon wherein the separated floating ice collides with the agitator to cause noise.

BRIEF DESCRIPTION OF DRAWINGS

FIG. 1 is an exploded perspective view of a cooling unit provided in a water purifier according to an embodiment of the present invention.

FIG. 2 is a perspective view of a partitioner according to an embodiment of the present invention.

FIG. 3 is a perspective view of a partitioning container configuring a partitioner.

FIG. 4 is a planar perspective view of a partitioning plate configuring a partitioner.

FIG. 5 is a bottom perspective view of the partitioning plate.

FIG. 6 is a view showing a state in which coolant circulates in a cooling unit according to an embodiment of the present invention.

FIG. 7 is a graph showing comparison between the cooling unit according to the embodiment of the present invention and a conventional cooling unit in terms of heat exchange efficiency.

FIG. 8 is a perspective view of a partitioner according to another embodiment of the present invention.

BEST MODE FOR CARRYING OUT THE INVENTION

Hereinafter, a water purifier according to an embodiment of the present invention will be described in detail with reference to the drawings.

FIG. 1 is an exploded perspective view of a cooling unit provided in a water purifier according to an embodiment of the present invention.

Since the cooling unit 10 according to the embodiment of the present invention is applicable to the water purifier disclosed in the above-described prior art, the structures and functions of the components excluding the cooling unit 10, and the water supply flow channels of cold water, hot water and purified water in the water purifier will be omitted.

Referring to FIG. 1, the cooling unit 10 according to the embodiment of the present invention includes a coolant tank 12 in which coolant is stored, an insulation case 11 surrounding the outer surface of the coolant tank 12 to insulate the coolant from outside air, and a drain valve 11a mounted on a lower end of the insulation case 11 to discharge coolant.

In addition, the cooling unit 10 further includes a cold water pipe 13 accommodated in the coolant tank 12 and having drinking water flowing therein, a partitioner 16 accommodated in the coolant tank 12 in a state of being placed on the cold water pipe 13, an evaporator 17 placed on the partitioner 16, and an agitator 18 placed in an inner space defined by the cold water pipe 13 after passing through the partitioner 16.

The partitioner 16 includes a partitioning plate 14 and a cylindrical partitioning container 15 detachably coupled to the partitioning plate 14.

Specifically, the partitioning plate 14 is horizontally placed in the coolant tank 12 to partition the internal space of the coolant tank 12 into an upper space, in which the evaporator 17 is placed, and a lower space, in which the cold water pipe 13 is placed.

In addition, a plurality of grid ribs are formed in the partitioning plate 14 to enable coolant located above the partitioning plate 14 and coolant located under the partitioning plate 14 to circulate by operation of the agitator 18.

In addition, the evaporator 17 is provided outside the partitioning container 15 to be wound in a plurality of turns in the circumferential direction of the partitioning container 15. The plurality of grid ribs is formed in the partitioning container 15 to prevent ice generated around the evaporator 17 from flowing into the lower space in which the cold water pipe 13 is accommodated.

In addition, the agitator 18 is placed in the space defined inside the cold water pipe 13 through an opening formed in the partitioning container 15. The cold water pipe 13 may be wound in a spiral shape to have a cylindrical shape having a predetermined length and diameter as shown in the figure.

In addition, the cooling unit 10 further includes a tank cover 19 covering the opened upper end of the coolant tank 12, an agitating motor 20 seated on the upper surface of the tank cover 19, and a case cover 21 covering the upper end of the insulation case 11 at the upper side of the tank cover 19.

The rotation shaft of the agitating motor 20 extends into the coolant tank 12 through the center of the tank cover 19, and the upper end of the agitator 18 is connected to the rotation shaft of the agitating motor 20. In addition, a water supply port 191 connected with a coolant supply hose is formed on one side of the tank cover 19.

In addition, a cold water pipe guide 212 guiding an inlet end and outlet end of the cold water pipe 13 and a water supply port accommodation part 211, in which the water supply port 191 is accommodated, are respectively formed in the case cover 21.

In addition, a plurality of guide grooves 121 are formed in the inner circumferential surface of the coolant tank 12 to extend downwardly by a predetermined length. Specifically, guide projections 141b (see FIG. 3) formed on the outer circumferential surface of the partitioning plate 14 are inserted into the guide grooves 121 to guide the partitioning plate 14. That is, in a state in which the guide projections 141b are inserted into the guide grooves 121, the partitioning plate 14 moves downwardly until the guide projections 141b are locked to the lower ends of the guide grooves 121, thereby being fixed at a point downwardly spaced apart from the upper end of the coolant tank 12.

In addition, a plurality of guide projections 122 are formed on the outer circumferential surface of the coolant tank 12 to extend downwardly by a predetermined length. In addition, a plurality of guide grooves 111, into which the guide projections 122 are inserted, are formed in the inner circumferential surface of the insulation case 11. The guide projections are inserted into the guide grooves, such that the coolant tank 12 is accurately inserted into the insulation case 11, to prevent the coolant tank 12 from being shaken in the insulation case 11. The same is true in the partitioning plate 14.

FIG. 2 is a perspective view of a partitioner according to an embodiment of the present invention, FIG. 3 is a perspective view of a partitioning container configuring a partitioner, FIG. 4 is a planar perspective view of a partitioning plate configuring a partitioner, and FIG. 5 is a bottom perspective view of the partitioning plate.

Referring to FIG. 2, the partitioner 16 may include a partitioning plate 14 horizontally placed inside the coolant tank 12 and a partitioning container 15 mounted on the central portion of the partitioning plate 14.

The partitioning plate 14 supports the evaporator 17 and prevents ice floating inside the coolant in the upper region of the partitioning plate 14 from flowing into the lower region of the partitioning plate 14.

In addition, the partitioning container 15 prevents ice floating inside the coolant in the upper region of the partitioning plate 14 from flowing into the lower region of the partitioning plate 14, similarly to the partitioning plate 14. A through-hole, through which the agitator 18 passes, is formed in the partitioning container 15.

Referring to FIG. 3, the partitioning container 15 according to the embodiment of the present invention may include a cylindrical body 152, a base 151 formed on the lower end of the body 152 and a head 155 formed on the upper end of the body 152.

The cross-section of the body 152 may be circular or polygonal. In addition, a grid portion 154 formed by intersecting ribs in horizontal and vertical directions is formed at the upper side of the body 152, and a blocking portion 153 is formed at the lower side of the grid portion 154. Coolant may flow to the inside and outside of the body 152 through the grid portion 154.

In contrast, the blocking portion 153 has a predetermined height from the lower end of the body 152 and extends in the circumferential direction of the body 152 to disable the coolant inside the body 152 to flow to the outside of the body 152 and to disable the coolant outside the body 152 to flow to the inside of the body 152.

In addition, the body 152 may further include a plurality of reinforcement ribs 156 connecting the head 155 with the base 151. The plurality of reinforcement ribs 156 may be formed in the circumferential direction of the body 152.

In addition, the lower end of the body 152 and the base 151 may be connected by a plurality of connection ribs 158. The plurality of connection ribs 158 may be spaced apart from each other at a predetermined gap in the circumferential direction along the inner edge of the base 151, such that communication holes, through which coolant communicates, are formed.

The ratio of the width (or height) of the blocking portion 154 to the length (or height) of the body 152 may be equal to or less than 50%. If the ratio is excessively large, coolant may not be smoothly circulated. Therefore, an appropriate ratio should be determined through experiments. The ratio may vary depending on the size and number of holes formed in the grid portion.

By forming the blocking portion 153, the coolant rising through the partitioning plate 14 and then flowing in the inward direction of the body 152 is guided to further rise by the blocking portion 153. As a result, the coolant forcibly flowing by the agitator 18 and rising from the lower side of the coolant tank 12 rises to the vicinity of the upper end of the body 152, thereby smoothly mixing the coolant at the upper side of the partitioning plate 14 and the coolant at the lower side of the partitioning plate 14. If an ice tube is formed outside the partitioning container 15, heat exchange between coolant and ice may be smoothly performed. This will be described in greater detail below.

Meanwhile, the outer diameters of the head 155 and the base 151 may be greater than that of the body 152 and the diameter of the base 151 may be greater than that of the head 155, without being limited thereto.

In addition, a plurality of fastening projections 157 may be formed on the lower end of the outer circumferential surface of the base 151 and may be spaced apart from each other at a predetermined gap in the circumferential direction of the base 151. In addition, each of the plurality of fastening projections 157 may be provided in the form of a rib extending by a predetermined length in the circumferential direction of the base 151.

Referring to FIGS. 4 and 5, the partitioning plate 14 configuring the partitioner 16 according to the embodiment of the present invention may include a grid plate 141, the planar shape of which is equal to the cross-sectional shape of the coolant tank 12 and an edge rib 141a extending upwardly from the outer edge of the grid plate 141.

Specifically, the outer circumferential surface of the edge rib 141a is closely in contact with the inner circumferential surface of the coolant tank 12. Guide projections 141b are formed on the outer circumferential surface of the edge rib 141a and are inserted into the guide grooves 121 formed in the inner circumferential surface of the coolant tank 12.

In addition, the grid plate 141 is horizontally placed inside the coolant tank 12 and grid ribs formed by intersecting ribs in the horizontal and vertical directions are formed in the grid plate 141. The coolant at the upper side of the grid plate 141 and the coolant at the lower side of the grid plate 141 may circulate through the grid plate 141, but the ice generated at the upper side of the grid plate 141 does not move to the lower side of the grid plate 141.

In addition, an agitator passing hole 14a having a size corresponding to the outer diameter of the base 151 is formed in the grid plate 141 and is defined by an inner sleeve 143. The inner sleeve 143 may be formed in a cylindrical shape to extend downwardly from the upper surface of the grid plate 141.

Specifically, the inner sleeve 143 is partitioned into an upper surface and a lower surface by a partitioning rib (or a step portion) 145, and a plurality of fastening grooves 144a fastened with the plurality of fastening projections 157 formed on the base 151 of the partitioning container 15 are formed in the upper surface of the inner sleeve to be spaced apart from each other in the circumferential direction. The lower surface of the inner sleeve 143 is defined as an inner water flow guide sleeve 146. The function of the inner water flow guide sleeve 146 will be described below with reference to the drawings.

More specifically, each of the plurality of fastening grooves 144a includes a downward groove 144b and a locking groove 144c. The downward groove 144b is formed above the locking groove 144c. The circumferential length of the locking groove 144c is greater than that of the downward groove 144b. For example, the circumferential length of the locking groove 144c may be twice or more more than the circumferential length of the downward groove 144b. In addition, the circumferential length of the downward groove 144b may be equal to or slightly greater than that of each fastening projection 157.

By such a structure, in order to couple the partitioning container 15 to the partitioning plate 14, the partitioning container 15 moves downwardly such that the fastening projections 157 pass through the downward grooves 144b. When the fastening projections 157 are located in the locking grooves 144c through the downward grooves 144b, the partitioning container 15 rotates in a direction of an arrow such that the fastening projections 157 are locked to the locking grooves 144c. Since the lower end of each of the locking grooves 144c is the partitioning rib (or the step portion) 145, the fastening projections 157 do not move out of the locking grooves 144c even when the partitioning container 15 moves downwardly.

The fastening grooves 144a and the fastening projections 157 are exemplary fastening means for detachably coupling the partitioning container 15 to the partitioning plate 14 and the other types of fastening means may be provided. For example, a hook may be formed on any one of the outer circumferential surface of the base 151 and the upper surface of the inner sleeve 143 and a hook reception portion, into which the hook is hooked, may be formed in the other of the outer circumferential surface of the base 151 and the upper surface of the inner sleeve 143.

Meanwhile, an outer water flow guide sleeve 142 may extend on the bottom surface of the grid plate 141.

Specifically, the outer water flow guide sleeve 142 may be formed outside the inner water flow guide sleeve 146, and a plurality of water flow guide projections 142a may be formed on the outer circumferential surface of the outer water flow guide sleeve 142. The plurality of water flow guide projections 142a may extend downwardly from the bottom surface of the grid plate 141 by a predetermined length and may be spaced part from each other at a predetermined gap in the circumferential direction of the outer water flow guide sleeve 142.

By forming the water flow guide projections 142a, the flow of coolant rising while rotating in the spiral shape by the agitator 18 may collide with the water flow guide projections 142, thereby vertically rising.

In addition, the upper end of the outer water flow guide sleeve 142 may be flush with the upper surface of the grid plate 141 and may further protrude from the upper surface of the grid plate 141 by a predetermined length.

In addition, an evaporator support rib 142b may extend upwardly from the upper surface of the grid plate 141 corresponding to the upper end of the outer water flow guide sleeve 142 by a predetermined length and an end portion thereof may be bent toward the center of the grid plate 141. The evaporator support rib 142b may prevent the evaporator 17 from horizontally vibrating and hold a lump of ice from being grown on the outer circumferential surface of the evaporator 17.

In addition, a plurality of evaporator seating ribs 147 may be formed on the upper surface of the grid plate 141 corresponding to the region between the inner sleeve 143 and the outer sleeve 142. The plurality of evaporator seating ribs 147 are spaced apart from each other at a predetermined gap in the circumferential direction of the inner sleeve 143. A seating groove 147a, in which the evaporator 17 is seated, may be formed in the outer upper surface of the evaporator seating ribs 147. Accordingly, when the evaporator 17 is seated in the seating groove 147a, the evaporator seating ribs 147 can prevent the evaporator 17 from horizontally vibrating.

In addition, a cold water pipe guide rib 148 for guiding the cold water pipe may be formed on one edge of the grid plate 141 to extend upwardly by a predetermined length. The cold water pipe guide rib 148 may be rounded to surround the outer circumferential surface of the cold water pipe 13 and may be formed to have two rounded portions to surround a suction-side cold water pipe and a discharge-side cold water pipe.

By forming the cold water pipe guide rib 148, it is possible to prevent ice grown on the surface of the evaporator 17 from being directly brought into contact with the cold water pipe 13. Therefore, it is possible to solve a problem that the ice freezes cold water flowing in the cold water pipe 13 to interrupt the cold water flowing.

Meanwhile, a plurality of cold water pipe seating ribs 149 may be formed between the inner sleeve 143 and the outer water flow guide sleeve 142, and may be spaced apart from each other at a predetermined gap in the circumferential direction of the inner sleeve 143. The cold water pipe seating ribs 149 are connected to the outer circumferential surface of the inner sleeve 143 and the inner circumferential surface of the outer water flow guide sleeve 142.

A seating groove 149a is formed in each cold water pipe seating rib 149 and an uppermost side of the cold water pipe 13 is seated in and supported by the seating groove 149a.

The lowermost side of the cold water pipe 13 is seated in and supported by a cold water pipe seating rib 123 (see FIG. 6) formed on the bottom of the coolant tank 12.

FIG. 6 is a view showing a state in which coolant circulates in the cooling unit according to the embodiment of the present invention.

Referring to FIG. 6, when the agitator 18 rotates, coolant flows in the coolant tank 12. As denoted by an arrow, flow of coolant moving to the upper side of the partitioning plate 14 and flow of coolant moving to the lower side of the partitioning plate 14 are formed.

Specifically, when the agitator 18 rotates, coolant at the upper side of the partitioning plate 14 and cooler than the coolant at the lower side of the partitioning plate 14 moves downwardly while rotating in the spiral shape along the upper surface of the blade of the agitator 18.

In addition, the coolant separated from the lower end of the upper surface of the blade of the agitator 18 collides with the cold water pipe 13 to be divided into rising coolant flow and falling coolant flow. The falling coolant falls to the bottom of the coolant tank 12 along the inner surface of the cold water pipe 13. The coolant falling to the bottom of the coolant tank 12 exchanges heat with the coolant located in the lower space of the coolant tank 12, such that the temperature of the coolant becomes uniform. At the same time, the coolant exchanges heat with the cold water pipe 13 to cool the drinking water flowing along the cold water pipe 13.

The coolant falling to the bottom of the coolant tank 12 collides with the bottom of the coolant tank 12 to be divided into a flow of coolant flowing toward the center of the cold water pipe 13 and then rising, and a flow of coolant flowing in the outward direction of the cold water pipe 13 and then rising to a space between the side surface of the coolant tank 12 and the cold water pipe 13.

The coolant rising at the outside side of the cold water pipe 13 should rise to a region close to the upper end of the coolant tank 12 through the partitioning plate 14, in order to improve heat exchange efficiency.

Specifically, since the evaporator 17 is placed on the partitioning plate 14, the temperature of the upper side region of the partitioning plate 14 is lower than the temperature of the lower side region of the coolant tank 12. Since the ice is generated around the evaporator 17, it is preferable that the coolant located on the bottom of the coolant tank 12 rises as high as possible to exchange heat with the coolant or ice around the evaporator 17 and then fall. To this end, the outer water flow guide sleeve 142 is formed.

More specifically, referring to solid arrows "a", the coolant rising from the bottom of the coolant tank 12 along the side surface of the coolant tank 12 collides with the outer water flow guide sleeve 142 to vertically rise and then moves toward the evaporator 17. As denoted by dotted arrows branched from the arrows "a", when the outer water flow guide sleeve 142 is not present, the rising coolant may not pass through the partitioning plate 14 and may return to the inner space of the cold water pipe 13.

Meanwhile, the coolant guided to the evaporator 17 by the outer water flow guide sleeve 142 exchanges heat with the evaporator 17 and then flows into the partitioning container 15 through the grid portion 154 formed in the partitioning container 15. In addition, the coolant flowing into the partitioning container 15 falls while rotating in the spiral shape by rotation of the agitator 18.

In addition, the coolant separated from the lower end of the agitator 18 and rising along the inner surface of the cold water pipe 13 rises toward the inner space of the evaporator 17 through the partitioning plate 14.

Referring to solid arrows "b", the coolant rising through the partitioning plate 14 collides with the blocking portion 153 formed in the partitioning container 15 to rise to the upper side of the partitioning container 15. The coolant flows to the upper side of the partitioning container 15 to exchange heat with the evaporator 17 and then flows into the partitioning container 15 through the grid portion 154, thereby forming falling coolant flow. In the conventional case in which the body 152 of the partitioning container 15 includes the grid portion 154 without the blocking portion 153, as denoted by the dotted arrows branched from the solid arrows b, the coolant passing through the partitioning plate 14 does not rise to the upper space of the partitioning container 15, thus heat exchange is not sufficiently performed.

In addition, the coolant rising by the agitator 18 is guided by the inner water flow guide sleeve 146 to pass through the partitioning plate 14, without returning to the agitator 18.

FIG. 7 is a graph showing comparison between the cooling unit according to the embodiment of the present invention and a conventional cooling unit in terms of heat exchange efficiency.

Referring to FIG. 7, an upper line A1 indicates change in temperature of cold water continuously discharged from the water purifier including the conventional cooling unit and a lower line A2 indicates change in temperature of cold water continuously discharged from the water purifier including the cooling unit according to the embodiment of the present invention.

Specifically, if heat exchange efficiency between the coolant and the cold water pipe is good, the amount of continuously discharged cold water increases. In order to improve heat exchange efficiency between the coolant and the cold water pipe, a difference in temperature between the coolant around the cold water pipe and the cold water pipe should be large. In order to increase the difference in temperature between the coolant around the cold water pipe and the cold water pipe, the coolant around the evaporator and the coolant around the cold water pipe should actively circulate and the contact area and time between the coolant rising from the vicinity of the cold water pipe and the surface of the evaporator should be increased.

The condition for improving heat exchange efficiency was satisfied by the inner and outer water flow guide sleeves 146 and 142 and the blocking portion 153 of the partitioning container 15 and thus the amount of discharged cold water was increased.

Referring to the graph again, drinking water having a temperature of 8° C. or less may be generally defined as cold water, but the reference temperature of cold water may slightly differ between manufacturers. When cold water is continuously discharged on the assumption that the temperature of cold water is 8° C., how many glasses of cold water is discharged was examined through experiments.

In the conventional case, the temperature of the seventh glass of discharged drinking water was greater than 8° C. In contrast, in the present invention, the temperature of up to the seventh glass of discharged drinking water was 8° C. As a result, it can be seen that the cooling unit according to the embodiment of the present invention has better heat exchange performance than the conventional cooling unit.

FIG. 8 is a perspective view of a partitioner according to another embodiment of the present invention.

Referring to FIG. 8, the partitioner according to the present invention has the same structure as the partitioner 16 of the previous embodiment, but is different from the partitioner 16 of the previous embodiment in that the blocking sleeve 143a further extends from the upper surface of the partitioning plate 14.

Specifically, the present embodiment is characterized in that the function of the blocking portion 153 of the partitioning container 15 according to the previous embodiment is performed by the blocking sleeve 143a extending from the upper surface of the grid plate 141 by a predetermined height. Accordingly, the body 152 of the partitioning container 15 according to the present embodiment may include only the grid portion 154.

More specifically, the inner sleeve 143 extends downwardly from the lower surface of the grid plate 141 and further extends upwardly from the upper surface the grid plate 141, and the portion of the inner sleeve 143 extending from the upper surface of the grid plate 141 may be defined as the blocking sleeve 143a.

Of course, the fastening grooves 144a are formed in the inner circumferential surface of the blocking sleeve 143a such that the fastening projections 157 are fastened to the fastening groove 144a, similarly to the previous embodiment. However, the fastening method is not limited thereto and the partitioning container 15 may be detachably coupled to the upper end of the blocking sleeve 143a using various fastening methods.

In another embodiment, a portion of the blocking portion may be implemented by the blocking sleeve 143a and the other portion of the blocking portion may be implemented by the blocking portion 153 formed in the partitioning container 15. That is, the function of the blocking portion may be performed by the partitioning container 15 and the blocking sleeve 143a.

The invention claimed is:

1. A water purifier comprising:
   a coolant tank configured to store coolant;
   a partitioning plate configured to partition an internal space of the coolant tank into an upper space and a lower space and having a grid rib formed therein to enable coolant of the upper space and coolant of the lower space to circulate;
   a cold water pipe disposed in the lower space;
   an evaporator disposed in the upper space; and
   an agitator disposed inside the coolant tank,
   wherein the partitioning plate includes an outer water flow guide sleeve extending downwardly from a bottom surface thereof.

2. The water purifier of claim 1,
   wherein the partitioning plate further includes a plurality of water flow guide projections protruding from an outer circumferential surface of the outer water flow guide sleeve and extending downwardly, and
   wherein the plurality of water flow guide projections are spaced apart from each other in a circumferential direction of the outer water flow guide sleeve.

3. The water purifier of claim 2,
   wherein the partitioning plate further includes an agitator through-hole formed in a region corresponding to an inner side of the outer water flow guide sleeve, and
   wherein the agitator through-hole is defined by an inner sleeve extending downwardly from the bottom surface of the partitioning plate.

4. The water purifier of claim 1,
   wherein the partitioning plate further includes an agitator through-hole formed in a region corresponding to an inner side of the outer water flow guide sleeve, and
   wherein the agitator through-hole is defined by an inner sleeve extending downwardly from the bottom surface of the partitioning plate.

5. The water purifier of claim 4, wherein a portion of the inner sleeve is an inner water flow guide.

6. The water purifier of claim 4, further comprising a partitioning container detachably coupled to the inner sleeve,
   wherein the partitioning container includes:
   a base;

a body extending from the base; and a head formed at an upper end of the body, and wherein the body includes:

a grid portion including a grid rib, and a blocking portion formed below the grid portion to guide upward flow of the coolant.

7. The water purifier of claim 6, wherein an inner diameter of the base is greater than an outer diameter of the body, and wherein lower ends of the base and the body are connected by a plurality of connection ribs spaced apart from each other along a circumferential surface of the body.

8. The water purifier of claim 6, further comprising a plurality of reinforcement ribs extending from an upper end to a lower end of an outer circumferential surface of the body, wherein the plurality of reinforcement ribs are spaced apart from each other in the circumferential direction of the body, and wherein lower ends of the plurality of reinforcement ribs are connected to the base.

9. The water purifier of claim 4, wherein the partitioning plate further includes a blocking sleeve further extending upwardly from an upper end of the inner sleeve.

10. The water purifier of claim 9, further comprising a partitioning container detachably coupled to the blocking sleeve, wherein a grid portion is formed in the partitioning container.

11. The water purifier of claim 10, wherein the partitioning container includes:

a grid portion configured to allow coolant outside the partitioning container to flow into the partitioning container; and a blocking portion formed below the grid portion to block flow of coolant outside the partitioning container into the partitioning container.

12. The water purifier of claim 4, further comprising an evaporator support rib extending from an upper surface of the partitioning plate to support the evaporator.

13. The water purifier of claim 4, wherein an upper end of the outer water flow guide sleeve further protrudes from an upper surface of the partitioning plate, and wherein the evaporator support rib extends from the upper end of the outer water flow guide sleeve.

14. The water purifier of claim 13, further comprising a plurality of evaporator seating ribs disposed between the outer water flow guide sleeve protruding from the upper surface of the partitioning plate and the inner sleeve, and wherein the plurality of evaporator seating ribs are spaced apart from each other in a circumferential direction of the inner sleeve.

15. The water purifier of claim 4, further comprising a plurality of cold water pipe seating ribs formed between the outer water flow guide sleeve and the inner sleeve, wherein the plurality of cold water pipe seating ribs are spaced apart from each other in a circumferential direction of the inner sleeve.

16. The water purifier of claim 1, further comprising a cold water pipe guide rib extending upwardly from one side of an outer edge of the partitioning plate to surround inlet and outlet ends of the cold water pipe.

\* \* \* \* \*